US012143780B2

(12) United States Patent
Chung

(10) Patent No.: US 12,143,780 B2
(45) **Date of Patent: *Nov. 12, 2024**

(54) PORTABLE CALIBRATION SYSTEM FOR AUDIO EQUIPMENT AND DEVICES

(71) Applicant: King Chung, Naperville, IL (US)

(72) Inventor: King Chung, Naperville, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/321,262

(22) Filed: May 22, 2023

(65) Prior Publication Data

US 2023/0292071 A1 Sep. 14, 2023

Related U.S. Application Data

(63) Continuation of application No. 17/394,844, filed on Aug. 5, 2021, now Pat. No. 11,706,578, which is a continuation of application No. 16/677,866, filed on Nov. 8, 2019, now Pat. No. 11,095,996.

(60) Provisional application No. 62/758,077, filed on Nov. 9, 2018.

(51) Int. Cl.

*H04R 29/00* (2006.01)
*H04R 3/04* (2006.01)

(52) U.S. Cl.

CPC ............. *H04R 29/001* (2013.01); *H04R 3/04* (2013.01); *H04R 2430/01* (2013.01)

(58) Field of Classification Search

CPC ...... H04R 29/00; H04R 29/001; H04R 25/00; H04R 25/30; H04R 25/305; H04R 25/70; H04R 3/04; H04R 2430/01

USPC ....................................... 381/56, 58, 60, 312

See application file for complete search history.

(56) References Cited

U.S. PATENT DOCUMENTS

| | | | |
|---|---|---|---|
| 3,220,505 | A | 11/1965 | Hargrave |
| 3,222,456 | A | 12/1965 | Hyman |
| 3,793,485 | A | 2/1974 | Feezor et al. |
| 4,107,465 | A | 8/1978 | Charlebois et al. |
| 4,748,598 | A | 5/1988 | Kopke |
| 6,468,224 | B1 | 10/2002 | Foreman et al. |
| 6,522,988 | B1 | 2/2003 | Hou |

(Continued)

FOREIGN PATENT DOCUMENTS

| | | | |
|---|---|---|---|
| CN | 107970034 | A | 5/2018 |
| KR | 1020070099749 | A | 10/2007 |
| WO | 2008139404 | A1 | 11/2008 |

OTHER PUBLICATIONS

AudCal Portable Audiometer Calibration System, http://www.larsondavis.com/products/audiometercalibrationsystems/audcal-portable-audiometer-calibration-system, downloaded Oct. 30, 2018 (3 pgs).

*Primary Examiner* — William A Jerez Lora

(74) *Attorney, Agent, or Firm* — McAndrews, Held & Malloy, Ltd.

(57) ABSTRACT

A portable calibration system is disclosed that calibrates an audio equipment without using a dedicated sound level meter. The calibration system comprises a coupler configured to couple a transducer to an energy sensor, where an output of the transducer is provided to the energy sensor via the coupler, an analyzer module configured to receive information from the energy sensor regarding the output of the transducer, a processor, in the analyzer module, configured to process the information to provide a result of a calibration for the audio equipment with respect to expected results, and a display configured to display the result of the calibration.

47 Claims, 8 Drawing Sheets

(56) References Cited

U.S. PATENT DOCUMENTS

| | | | | |
|---|---|---|---|---|
| 7,672,802 | B2 | 3/2010 | Foreman | |
| 7,793,545 | B2 | 9/2010 | Mayou et al. | |
| 8,577,050 | B2 | 11/2013 | Margolis et al. | |
| 8,831,244 | B2 | 9/2014 | Apfel | |
| 11,095,996 | B2 | 8/2021 | Chung | |
| 2003/0065276 | A1 | 4/2003 | Akita | |
| 2008/0167575 | A1 | 7/2008 | Cronin et al. | |
| 2008/0228101 | A1 | 9/2008 | Allen et al. | |
| 2009/0323989 | A1 | 12/2009 | Capper et al. | |
| 2010/0191143 | A1 | 7/2010 | Ganter et al. | |
| 2011/0009770 | A1 | 1/2011 | Margolis et al. | |
| 2012/0155689 | A1* | 6/2012 | Milodzikowski | H04R 1/1016 381/379 |
| 2013/0315414 | A1* | 11/2013 | Pribyl | H04R 1/1083 381/74 |
| 2014/0126730 | A1* | 5/2014 | Crawley | H04R 29/001 381/59 |
| 2017/0064424 | A1 | 3/2017 | Qutub et al. | |
| 2017/0164127 | A1* | 6/2017 | Gautama | H04R 1/24 |
| 2017/0231535 | A1 | 8/2017 | Lasry | |
| 2019/0128971 | A1* | 5/2019 | Canas | H02H 3/044 |

* cited by examiner

PORTABLE CALIBRATION SYSTEM FOR AUDIO EQUIPMENT AND DEVICES

CROSS-REFERENCE TO RELATED APPLICATIONS/INCORPORATION BY REFERENCE

This patent application is a continuation of patent application Ser. No. 17/394,844 filed on Aug. 5, 2021, which is a continuation of patent application Ser. No. 16/677,866 filed on Nov. 8, 2019 (now U.S. Pat. No. 11,095,996), which makes reference to, claims priority to, and claims benefit from provisional patent application No. 62/758,077 filed on Nov. 9, 2018.

BACKGROUND

Certain embodiments of the disclosure relate to sound equipment and more specifically to a portable calibration system for audio equipment and devices.

Limitations and disadvantages of conventional and traditional approaches, and improved performance over conventional and traditional approaches will become apparent to one of skill in the art through comparison of such systems with some aspects of the present disclosure as set forth in the remainder of the present application with reference to the drawings.

SUMMARY

The present disclosure discloses a portable calibration system for audio equipment and devices, substantially as shown in and/or described below, for example in connection with at least one of the figures, as set forth more completely in the claims.

These and other advantages, aspects and novel features of the present disclosure, as well as details of an illustrated embodiment thereof, will be more fully understood from the following description and drawings.

DETAILED DESCRIPTION

Various example embodiments of the disclosure will be described in detail with reference to the accompanying drawings such that they can be made and used by those skilled in the art.

Various aspects of the present disclosure may be embodied in many different forms and should not be construed as being limited to the example embodiments set forth herein. Rather, these example embodiments of the disclosure are provided so that this disclosure will be thorough and complete and will convey various aspects of the disclosure to those skilled in the art.

Generally disclosed is a calibration system that may use, for example, a user device to run a software program(s) or an application(s) for calibrating audiometric and entertainment transducers. The user device may be, for example, a tablet computer, a laptop computer, a smartphone, etc. The user device may also be, for example, a personal computer or other types of electronic devices that can run a software program or application for calibrating the audiometric and entertainment transducers. The software program or application may be present in the user device, provided with various embodiments of the disclosure for loading onto the user device, or downloaded from a website. The calibration system may include one or more couplers that allow sounds, or mechanical vibrations for bone conduction systems, for example, emitted by various transducers of different sizes and styles to be measured, a sensor system that allows the measurement and analysis of equivalent sound pressure level emitted by different types of transducers, an environmental sensor system that can detect, for example, humidity, temperature, atmospheric pressure, ambient noise, etc., and an analysis and display system that is implemented as, for example, a computer software or application and that serves as human-machine interface. Accordingly, the calibration system may be an easy to use, portable calibration system.

Transducers convert one form of energy to another, e.g., acoustic to electrical, electrical to acoustic, mechanical to electrical, electrical to mechanical, etc. They are widely used in different entertainment devices or audiometric systems for measuring different functions of the hearing system. The transducers include, but are not limited to, headphones, earphones, insert earphones of audiometers/electrophysiology equipment, bone conductors of audiometers, etc. As each transducer and their casing may have different shapes, sizes, and materials, it is difficult for users to know the transducer output levels, which could be important for accurate measurements of hearing functions, hearing protection, or device safety.

Figure 1:
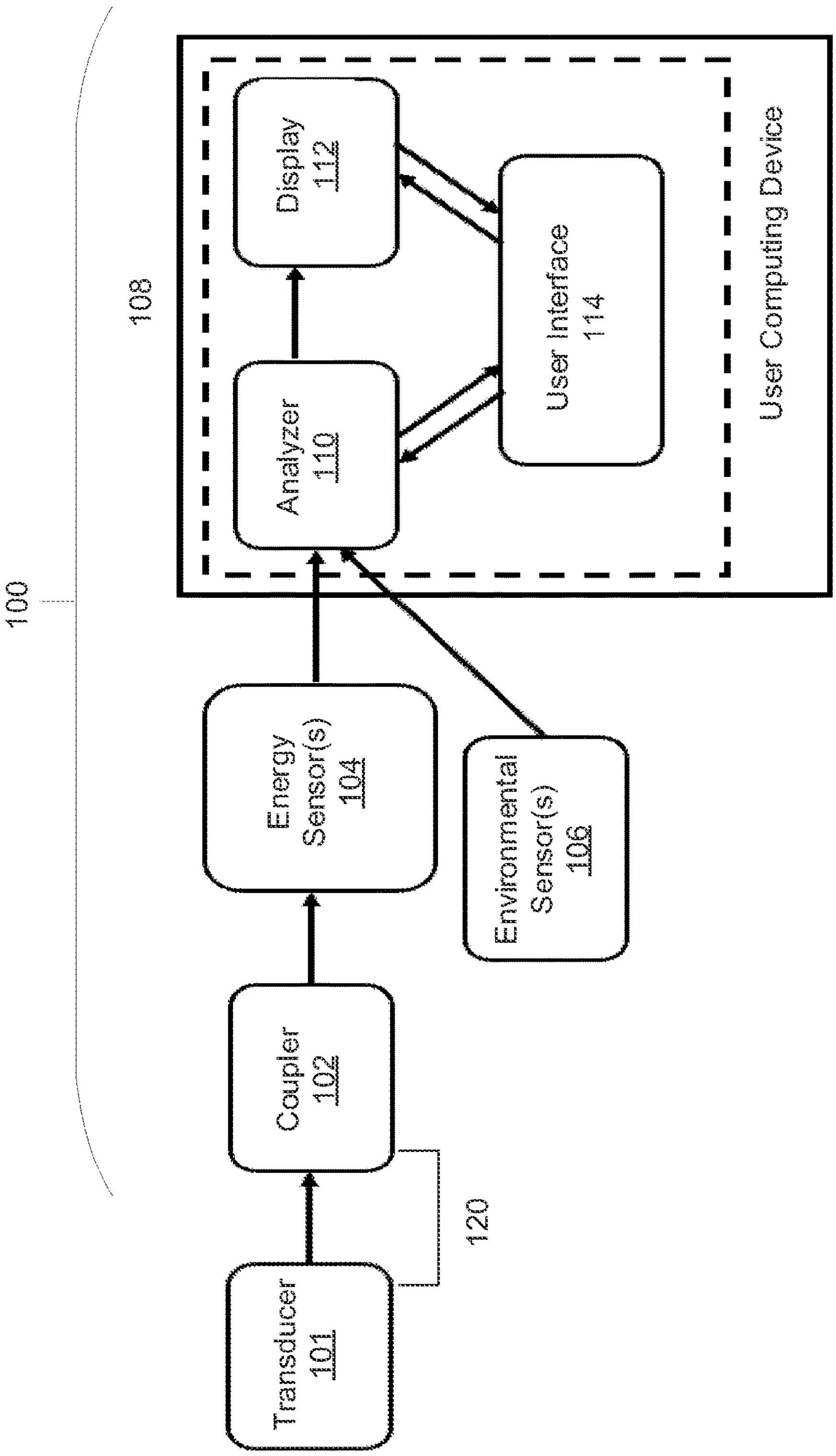
FIG. 1 is a block diagram of an example calibration system, in accordance with an embodiment of the present disclosure.

FIG. 1 is a block diagram of an example calibration system, in accordance with an embodiment of the present disclosure. Referring to FIG. 1, there is shown a calibration system 100 comprising a coupler 102, an energy sensor 104, environmental sensors 106, and a user computing device 108. The user computing device 108 may comprise an analyzer module 110, a display 112, and user interface 114.

A particular coupler 102 may be configured to receive a particular type of transducer 101 with a particular shape and size that outputs a specific form of energy (acoustic or mechanical). The coupler 102 may simulate different acoustic scenarios for which the transducer 101 is used. The coupler 102 provides a conduit by which the acoustic/mechanical energy is transferred from the transducer 101 to the energy sensor 104 that detects different forms of energy.

The coupler 102 may comprise a cavity that has an opening size, volume, and dimensions appropriate for a specific type of a transducer. Accordingly, in an embodiment, there may be a plurality of different couplers 102 for different transducers. The coupler 102 may be coupled to the sensor 104 via a first end and coupled to the transducer 101 via a second end. Various embodiments of the disclosure may also use various adaptors 503 (FIG. 5) to allow a single coupler 102 to be used with a plurality of different transducers 101. This is described in more detail with respect to FIG. 5.

Accordingly, the sizes of the two ends (the openings) of the coupler 102 or the coupler 102 and an appropriate adaptor 503 may depend on the sizes, shapes, and materials of the sensor 104 and the transducer 101 to minimize energy leakage. Therefore, a standardized force or pressure defined by a reference national or international standard may be achieved by using a plurality of couplers 102, or a coupler 102 and a plurality of adaptors 503.

The environmental sensor 106 may detect various environmental conditions such as, for example, humidity, temperature, atmospheric pressure, ambient noise, etc., that may affect transmission of acoustic and/or mechanical energy. The sensors 104/106 may output electrical signals to the user computing device 108.

The analyzer module 110 may include, for example, a software program or application in a user device such as, for example, a tablet, computer, cellular phone, etc. The analyzer module 110 may receive the electrical signals from one or more sensor(s) 104/106 and apply different sensitivity scale according to the type of coupler 102 and transducer 101 used, and reference an appropriate calibration standard. The referenced calibration standard may be, for example, regional, country specific, or an international standard. The calibration standard used may depend on, for example, selections made via the user interface 114, or a geographical position detected by a geographical locating system, which may be a part of, for example, the processing module 800 (which may be similar to the user computing device 108). Accordingly, the analyzer module 110 may automatically report, for example, on the display 112 the measured levels from the sensors 104/106, expected levels from the appropriate standard, and the differences between the measured and expected levels.

The display 112 and the user interface 114 may be part of, for example, the tablet, computer, cellular phone, etc., and serve as a human-machine interface. The display 112 may be used to inform and instructs the human user of the calibration setup, display transducer and coupling system information, sensor output characteristics, analyzer results, and/or other relevant information needed to carry out the calibration for equipment.

The transducer 101 may be, for example, any sound delivery device including but not limited to an entertainment device, educational device, assistive listening device, Bluetooth enabled device, audiometers, electrophysiology testing equipment, otoacoustic emissions testing equipment, tympanometry testing equipment, etc.

The transducer 101 may be coupled to the coupler 102 or the adaptor 503 by a weight. This may be, for example, when the transducer 101 and the coupler 102 are vertically aligned with each other so that the weight provides the force or pressure to keep the transducer 101 in place with respect to the coupler 102 or the adaptor 503.

In another embodiment of the coupling system 100, the force or pressure applied between the transducer 101 and the coupler 102 or the adaptor 503 may be achieved, for example, by a clamp 120 that can be changed for different shapes, sizes, and materials of the transducer 101, or other devices that can provide a similar function as the clamp 120. A clamp 120 may be configured to apply standardized force/pressure specified by a reference national/international standard.

The sensors 104 and 106 may consist of individual sensors or a combination of sensors for detecting different forms energy and environmental factors. Accordingly, such a sensor 104 may comprise sensors for detecting acoustic energy as measured in sound intensity and sound pressure level and/or mechanical vibrations as measured in pressure or force. Accordingly, the sensor 104 may be a microphone that senses the sound pressure levels emitted by the transducer 101. In another embodiment of the disclosure, the sensor 104 may be a pressure sensor that senses the strength of mechanical vibrations.

For example, the transducer 101 may be put directly on the sensor 104 that measures the mechanical force/vibration or sound pressure. For example, the transducer 101 may be a bone conductor of an audiometer, which may be put on top of a mechanical sensor 104 to measure the vibratory force.

The sensor 104/106 may output electric signals to the analyzer module 110 using, for example, a cable. The cable may be, for example, an optical cable when the sensor 104/106 is configured to output optical signals and the analyzer module 110 is configured to receive optical signals. Various embodiments of the disclosure may also provide a wireless output by the sensor 104/106 where the analyzer module 110 is configured to receive wireless signals.

The environmental sensors 106 may be implemented, for example, as a separate input to the analyzer from the energy sensor 104. The sensors 106 may measure one or more environmental factors of the surrounding area, which may include but is not limited to temperature, humidity, atmospheric pressure, ambient noise, etc. These measurements may be provided to the analyzer module 110 and the analyzer module 110 may make adjustments for the expected transducer output levels for the particular environment.

In various embodiments of the disclosure, the sensor 104 may have a built-in or detachable apparatus to simulate the real-life application of the transducer 101. Such a built-in or detachable apparatus may include, but is not limited to, a skull or a separation device to simulate different head sizes. This may be, for example, for a bone vibrator transducer 101 where the size of the head may affect the pressure output by the transducer 101.

Accordingly, it can be seen that the calibration system 100 may use a computer program or application that can be installed in a variety of platforms, such as, for example, cellular phones, tablets, laptop computers, etc., that may have an appropriate interface to receive information from the sensors 104/106.

The interface for receiving information from the sensor 104 may be, for example an audio interface such as a sound card that receives electrical signals from the sensor 104, which may be a microphone, and the electrical signal is converted to sound pressure level in dB or dB SPL or any other scales with different references at different frequencies by the analyzer module 110. A processor such as, for example, processor 810 of FIG. 8 may be used to process various functions attributed to the analyzer module 110. Accordingly, it may be understood that when the analyzer module 110 is described as performing a function, that function may be performed by, for example, one or more processors 810 of FIG. 8.

Accordingly, mechanical pressure of the transducer 101 detected by the sensor 104 may be communicated to the analyzer module 110 as an electrical signal. The analyzer module 110 may then convert the electrical signal to estimated sound pressure levels when the transducer is worn on the head and vibrating the skull.

The environmental sensors 106 may comprise a temperature sensor that outputs an electrical signal indicating a temperature. Other environmental sensors 106 may include, but is not limited to, humidity sensor and atmospheric pressure sensor as these factors may affect acoustic properties of sounds. Another environmental sensor 106 may be, for example, a sound detecting sensor such as a microphone that detects ambient noise. Depending on the transducer 101 or signal characteristics, the analyzer module 110 may use other sensors to detect, measure, and analyze data for information that can be used by the software program or application.

The analyzer module 110 may analyze the sounds or mechanical vibrations at different frequencies using various octave band filters such as, for example, ⅓ octave band, 1 octave band, etc. The analyzer module 110 may also monitor, for example, ambient noise level in the environment and provide a warning when the ambient noise level exceeds a permissible level specified in reference calibration standards for different types of transducers. The ambient noise may be detected by one or both of the energy sensor 104 or the environmental sensor 106.

The analyzer module 110 may also analyze, for example, characteristics of the outputs of the sensor 104 such as, for example, frequency, duration, distortion, linearity, range of linearity, rise time, fall time, frequency and amplitude spectrum, phase spectrum, amplitude-time waveform, equivalent long-term-exposure level, permissible duration of exposure according to noise exposure standards, distortion level, equivalent sone or phon ratings using relevant physical and psychophysical references and standards, reverberation time of the testing room, etc.

The analyzer module 110 may further provide correction factors based on the transducer 101, the coupler 102, reference standard, and/or environmental factors. This process may be accomplished in one step or multiple steps. For example, the analyzer module 110 may apply the coupler sound pressure level differences between a natural ear canal and the coupler 102 to derive the expected measured levels for the transducer 101 and the coupler 102 used in the calibration process. This may be, for example, to compensate for differences in sound due to differences between an ear canal and the coupler 102. The analyzer module 110 may also apply corrections in the expected levels based on one or more of temperature, humidity, atmospheric pressure, as well as ambient noise where the calibration is carried out.

The analyzer module 110 may apply the coupler sound pressure level difference and the user's preferred reference calibration standards for auditory equipment and apply to the expected and/or measured sound pressure level to examine whether the transducer 101 is in calibration, how much the transducer may be out of calibration, etc. It may be noted that even if the transducer is deemed to be in calibration, there may be an acceptable deviation from ideal calibration points. Accordingly, the analyzer module 110 may provide instant feedback, via, for example, output on the display 112, the deviations and allow the user to adjust the sound pressure level of the transducer 101 and remeasure as needed, or allow the generation of a correction table to document the amount of deviation or correction factor at each frequency.

The display 112 may display the analyzer output and the user interface 114 may allow the user to give instructions to the analyzer module 110 to analyze different characteristics of the sound. The display 112 and the user interface 114 may also generate a list of tests that the user can choose from. The display 112 may then display instructions to the user based on the chosen option and guide the user through the transducer setup, calibration setup, and the measurement phases. The user interface 114 may also generate calibration certificates as proof of calibration.

In an embodiment of the disclosure, the calibration system 100 may receive output of the transducer 101 and the processor may process the output of the sensor 104. The analyzer 110 (e.g., the processor 810) may determine a sound level of the transducer output, and compare the sound level with an appropriate hearing safety standard to inform the user whether the sound level is below a recommended safe level, and also inform the user for how long the sound level may be present before it is deemed to be not safe. The processor 810 may automatically determine whether the sound level is safe, and for how long it may be safe. This information may be provided, for example, via the display 112. Other devices may also be used to alert to the unsafe level of the transducer output. For example, a light may be flashed to alert the user to the dangers of the sound level that may be output by the transducer 101.

Figure 2:
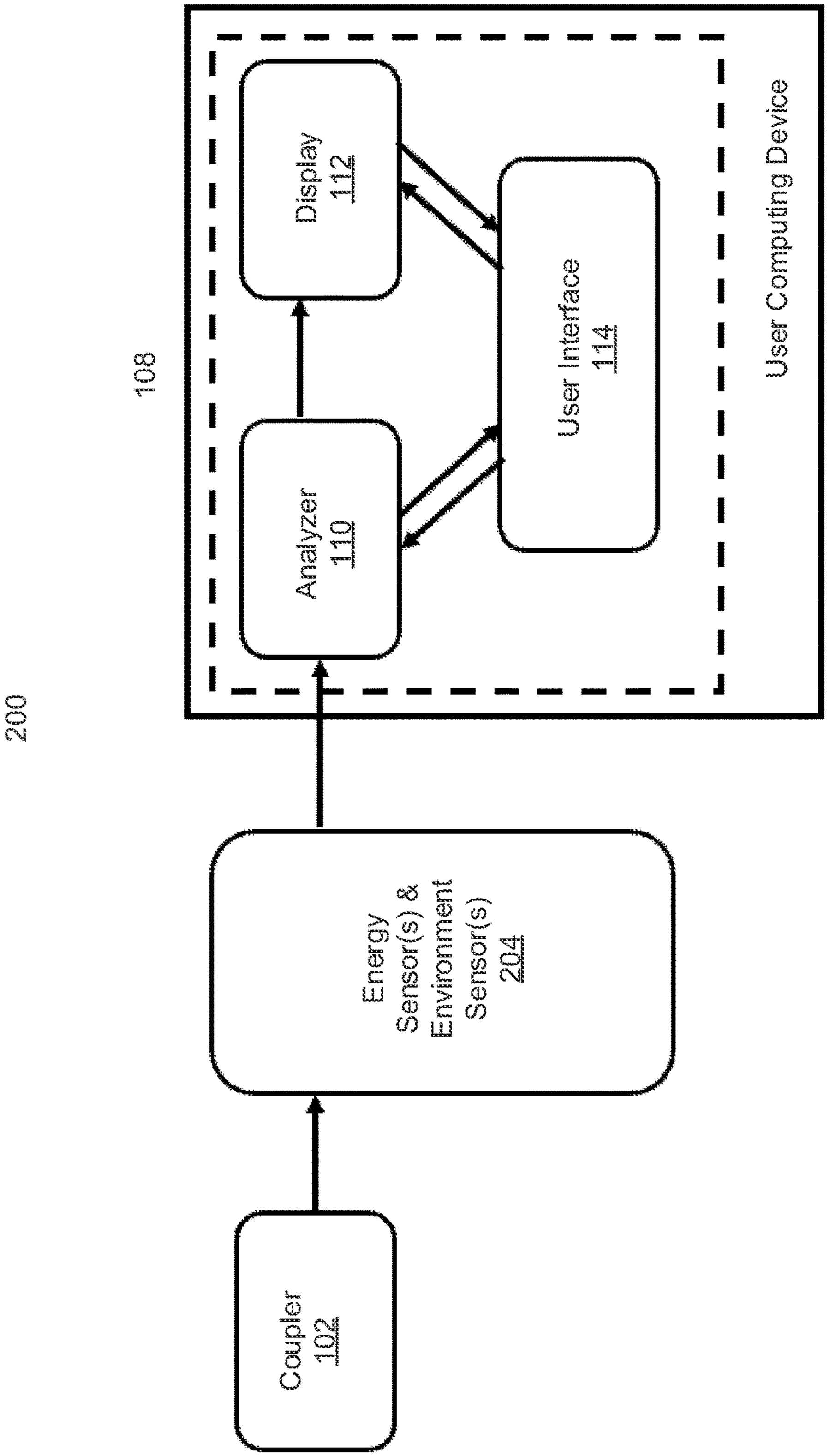
FIG. 2 is a block diagram of another example calibration system, in accordance with an embodiment of the present disclosure.

FIG. 2 is a block diagram of another example calibration system, in accordance with an embodiment of the present disclosure. Referring to FIG. 2, there is shown a calibration system 200 that may be similar to the calibration system 100 except that the sensors 104 and 106 are combined as a single sensor system 204. Accordingly, there may be one communication path from the sensor system 204 to the analyzer module 110, rather than two communication paths described with respect to FIG. 1. Therefore, the sensor system 204, may be an integrated sensor system with an acoustic sensor (e.g., a microphone), a mechanical sensor (e.g., a pressure sensor), and/or one or more environmental sensors.

The sensors in the sensor system 204 may comprise individual sensors or a combination of sensors for detecting different forms energy and environmental factors. Accordingly, such a sensor system 204 may comprise sensors for acoustic energy as measured in sound intensity and sound pressure level, for mechanical vibrations as measured in pressure or force, for environmental factors such as temperature, atmospheric pressure, humidity, ambient noise, etc. that might affect the measurement of sound pressure or mechanical pressure. The sensor system 204 may communicate with the analyzer module 110 using an electrical cable, an optical cable, or wirelessly depending on the application.

Figure 3:
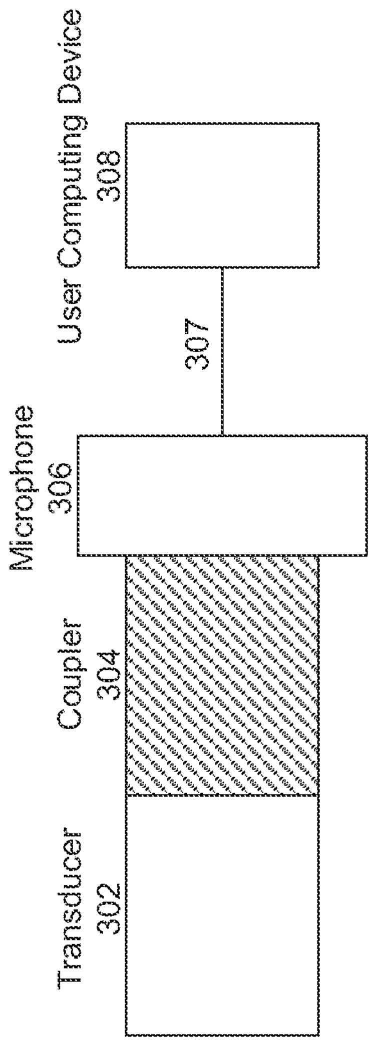
FIG. 3 is a diagram of a coupler in use, in accordance with an embodiment of the present disclosure.

FIG. 3 is a diagram of a coupler in use, in accordance with an embodiment of the present disclosure. Referring to FIG. 3, there is shown a transducer 302 coupled to the microphone 306 via the coupler 304. The microphone 306 may provide output signals to a user computing device 308 that relate to detected output from the transducer 302.

The microphone 306 may be a different size than, for example, the coupler 304. For example, the microphone 306 may be smaller than the coupler 304. The microphone 306 may also be, for example, mounted on a carrier that is bigger than the microphone 306. Additionally, while the microphone 306 is specifically provided in FIG. 3 for the purpose of illustration, various embodiments of the disclosure may have any energy sensor described in FIGS. 1 and 2 for the microphone 306.

Figure 4:
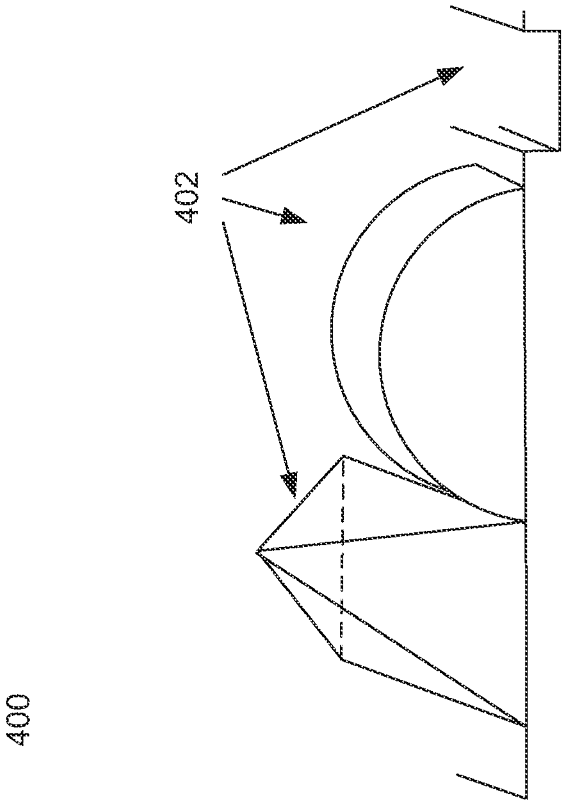
FIG. 4 is an illustration of an example interior of a coupler, in accordance with an embodiment of the present disclosure.

FIG. 4 is an illustration of an example interior of a coupler, in accordance with an embodiment of the present disclosure. Referring to FIG. 4, there is shown an example interior portion 400 of, for example, the coupler 102. The interior portion 400 may comprise, for example, non-planar surfaces to mitigate echoes, reflections, and/or generation of standing waves that may affect measurement by the sensor 104/204. The non-planar surfaces may comprise, for example, various shapes 402 to allow as much of the energy from the transducer 101 to be communicated to the sensor 104 while mitigating generation of echoes, reflections, and/or standing waves. Some embodiments may use, for example, a repetitive pattern if the pattern is suitable for mitigating echoes, reflections, and/or generation of standing waves or cavity resonances. Various embodiments may also use rough surfaces that comprise non-regular projections.

The various structures may be, for example, geometric shapes such as, for example, hemispheres, ridges, dents, triangular pyramids, etc. The surfaces of the coupler 102 and/or the adaptor 503 (FIG. 5) may also be tilted and/or non-planar with respect to each other, for example. This may, for example, reduce direct reflections of sound and the resonance of the coupler 102 and/or the adaptor 503.

In an embodiment of the calibration system 100/200, the coupler 102 and/or the adaptor 503 may have smooth surfaces on the inside surfaces that receives the transducer 101. However, various embodiments of the disclosure need not be limited so. For example, the coupler 102 and/or the adaptor 503 may be non-smooth on the inside surfaces that receives the transducer 101. The configuration of the coupler 102 and/or the adaptor 503 may also be such that the energy sensor(s) 104 is not directly opposite the transducer 101.

Figure 5:
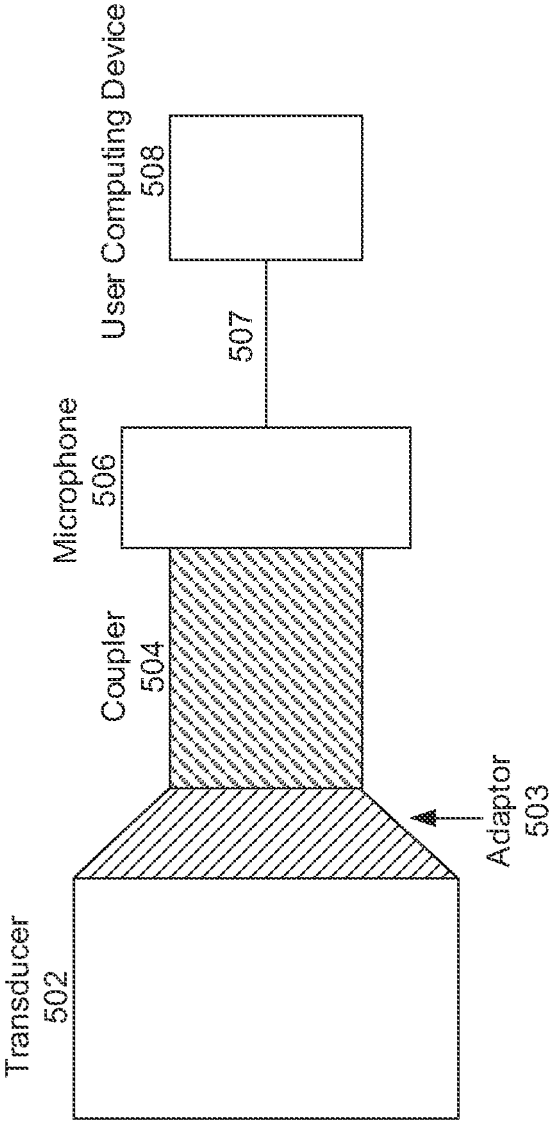
FIG. 5 is a block diagram of an adaptor for a coupler, in accordance with an embodiment of the present disclosure.

FIG. 5 is a block diagram of an adaptor for a coupler, in accordance with an embodiment of the present disclosure. Referring to FIG. 5, there is shown a transducer 502, an adaptor 503, a coupler 504, a microphone 506, a user computing device 508, and a communication path 507 between the microphone 506 and the user computing device 508. The communication path 507 may be wired or wireless.

The adaptor 503 may be specific for a type of transducer 502 such that a specific adaptor 503 may couple one of a plurality of transducers 502 to the coupler 504. Accordingly, one coupler 504 may be used with a plurality of adaptors 503. Alternatively, there may be a plurality of couplers 504 where each may be specific for a particular type of transducer 502. An embodiment of the disclosure may have the coupler 504 configured so that it can couple to a transducer 502, while another embodiment of the disclosure may have the coupler 504 only able to couple to an adaptor 503.

The coupling of the adaptor 503 to the coupler 504 may involve a clamp 120 or a similar device, or the adaptor 503 may be inserted into the coupler 504 or vice versa to form a tight fit with minimal sound leakage at the coupling between the coupler 504 and the adaptor 503.

Figure 6:
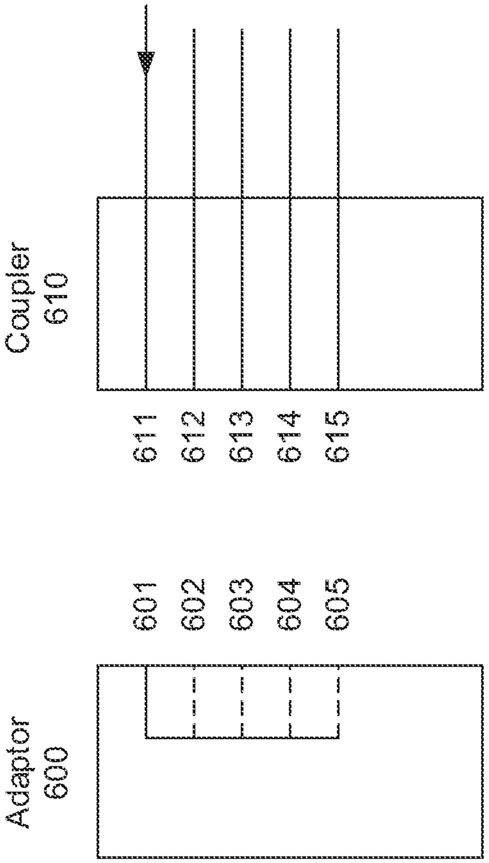
FIG. 6 is a diagram of an example circuitry for identifying an adaptor, in accordance with an embodiment of the present disclosure.

FIG. 6 is a diagram of an example circuitry for identifying an adaptor, in accordance with an embodiment of the present disclosure. Referring to FIG. 6, there is shown an adaptor 600 and a coupler 610. The coupler 610 may have a plurality of electrical conductors 611-615 that may be, for example, wires, that go to a sensor 104/204/etc. The conductor 610 may be provided a signal by, for example, the sensor 104/204. When the coupler 610 is coupled to the adaptor 600, the electrical conductors 611-615 may mate with a corresponding one of electrical conductors 601-605 on the adaptor 600. Accordingly, the signal provided to the electrical conductor 611 may propagate to the electrical conductor 601.

Then, depending on which of the electrical conductors 602-605 are connected to the electrical conductor 601 for a specific adaptor 600, the signal on the electrical conductor 611 may be present on one or more of the electrical conductors 602-605, and, hence, on the corresponding electrical conductors 612-615. The sensor 104/204 may then be able to identify the adaptor 600 and the corresponding transducer 101 based on the presence of the signal on one or more of the electrical conductors 612-615, and then communicate the identified adaptor 600 (and, hence, the identified transducer 101) to the analyzer module 110. The signal provided may be one of, for example, a ground connection, a DC voltage, a carrier frequency, a modulated carrier frequency, digital signal, etc. Various embodiments of the disclosure may allow for multiple signals over multiple electrical conductors.

Therefore, the sensor 104/204 may automatically detect the type of the adaptor 600 (and, hence, the identified transducer 101) attached and automatically inform the analyzer module 110, which may then apply different correction factors to the sound pressure level measured and the expected levels for the type of transducer being calibrated.

While five electrical conductors are shown as an example, various embodiments of the disclosure may have different number of electrical conductors. Additionally, in various embodiments of the disclosure, the coupler 610 may receive the signal from the analyzer module 110 and connect the electrical conductors 611-615 to the analyzer module 110. The connection may be directly from the analyzer 100 or via the sensor 104/204. Accordingly, the analyzer module 110 may be able to determine the adaptor 600.

Various embodiments of the disclosure may comprise pull-up and/or pull-down resistors or circuitry (not shown) at the adaptor 600, coupler 610, the sensor 104/204, and/or the analyzer module 110.

When the coupler 610 is able to couple to adaptors 600 as well as the transducer 101, an embodiment of the disclosure may have the electrical conductors 612-615 pulled down and/or pulled up, for example, to affirmatively indicate that the coupler 610 does not have any adaptor 600 coupled to it. When a carrier signal is used, whether modulated or not, or a digital signal is used, a pull-up or pull-down may not be needed. Accordingly, the various adaptors 600 may have at least one of the electrical conductors 602-605 connected to the electrical conductor 601.

When the coupler 610 is only able to couple to adaptors 600 and not directly to a transducer 101, there may not need to be any indication that there is not an adaptor 600 coupled to the coupler 610. However, some embodiments of the disclosure may have the electrical conductors 612-615 pulled up and/or pulled down to provide an affirmative indication that there is no adaptor 600 coupled to the coupler 610.

Accordingly, when there is an affirmative indication of an adaptor not being present, the four electrical conductors 602-605 (or 612-615) may allow for identifying 15 adaptors (transducers), with one combination being reserved for affirmative indication that there is no adaptor 600 coupled to the coupler 610.

While the methods above described identifying a transducer 101, various embodiments of the disclosure may not be limited so. Other means of identification may also be used for different embodiments of the disclosure. For example, a transponder (not shown) may be used at the adaptor 600 and/or the coupler 610, where power for the transponder may be provided by a battery or by power received via, for example, an electrical conductor 601/611. One of the other electrical conductors 602/605 (612/615) may be a ground conductor, and another of the electrical conductors 602/605 (612/615) may be a signal conductor that carries identification information from the transponder. Some embodiments of the disclosure may have the transponder information be transmitted wirelessly.

Figure 7:
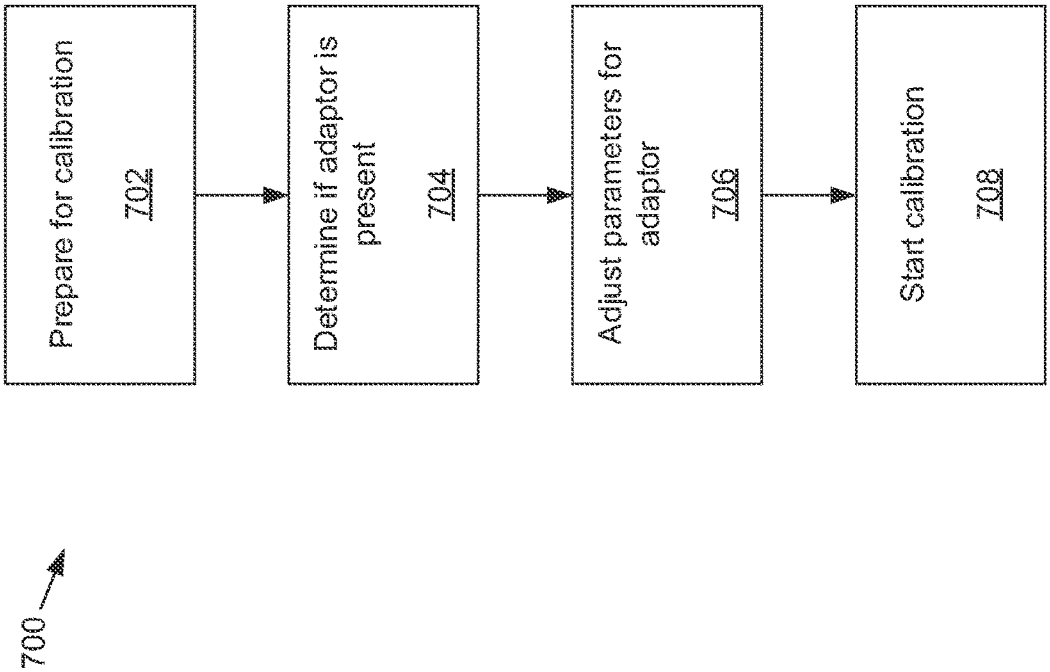
FIG. 7 is a flow diagram of the calibration system in use, in accordance with an embodiment of the present disclosure.

FIG. 7 is a flow diagram of the calibration system in use, in accordance with an embodiment of the present disclosure.

Referring to FIG. 7, there is shown a flow diagram 700 comprising blocks 702-708. At block 702, the calibration system 100 may be prepared for calibration of a transducer 101. For example, after selecting the transducer 101 to be calibrated, an appropriate adaptor 503 may be selected if needed and coupled to the coupler 102. The user may then couple the transducer 101 to the adaptor 503, or to the coupler 102 if the adaptor 503 is not needed. The user may then start the calibration process via, for example, the user interface 114. The user may also, for example, enter the transducer 101 to be calibrated via the user interface 114. This entry may override the automatic identification of the transducer 101 via the electrical conductors 601-605/611-615.

At block 704, a determination may be made as to whether there is an adaptor 503 present, or if a default identification for a transducer 101 should be made. However, if a transducer entry was made in block 702, that entry may be used rather than identifying the transducer 101 via an identification mechanism described with respect to FIG. 6.

At block 706, the analyzer module 110 may apply different sensitivity scale according to the type of transducer 101 and the coupler 102 used, and also reference an appropriate calibration standard. The calibration standard may be selected by the user via the user interface 114, or may be selected automatically by the analyzer module 110 by locating the present location using, for example, a geographical locating system described with respect to FIG. 8.

Any ambiguities may result in, for example, the analyzer module 110 outputting a request for clarification via the display 112. For example, when a determined location does not map to any specific standard, a request to select a standard may be displayed. The analyzer module 110 may also display, for example, standards for nearby countries or regions to select from, as well as other standards that can be selected or entered. The user may have the choice of incorporating or not incorporating these sensor readings in the calibration process via the user interface. The user may also choose the characteristics of a location associated with the calibration process via the user interface. This allows the user to calibrate equipment to be used in another location.

At block 708, the calibration of the transducer 101 may start. The transducer 101 may, for example, output specific frequencies to be analyzed by the analyzer module 110. The analyzer module 110 may take into account the outputs from the environmental sensors 106. Accordingly, the analysis of the output of the transducer 101 may be compensated according to the outputs of the sensors 106 such as, for example, temperature, humidity, atmospheric pressure, ambient noise, etc. The outputs of the sensors 106 may be checked once prior to starting the calibration, or may be checked multiple times during the calibration.

Accordingly, the analyzer module 110 may provide correction factors based on the transducer 101, the coupler 102, the reference standard, and/or the environmental factors for accurate calibration. The analyzer module 110 may apply the coupler sound pressure level difference and the user's preferred reference calibration standards for an auditory equipment comprising the transducer 101 and apply to the expected and/or measured sound pressure level to examine whether the transducer 101 is in calibration, how much the transducer may be out of calibration, etc. This information may be displayed on the display 112 in a variety of manners selected by the user. For example, there may be bar graphs, tables displayed, etc.

Figure 8:
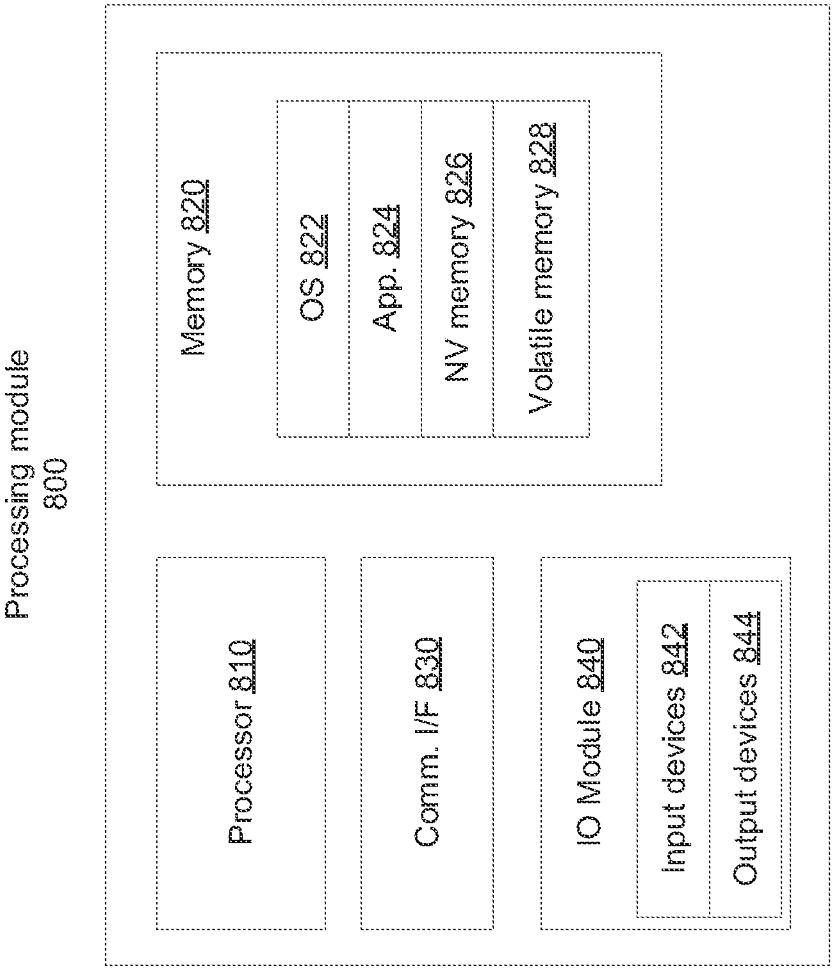
FIG. 8 is an example block diagram of a processing module, in accordance with an embodiment of the present disclosure.

FIG. 8 is a block diagram of an example processing module for use in an entity, in accordance with an embodiment of the present disclosure. Referring to FIG. 8, there is shown a processing module 800 that may be similar to, for example, the user computing device 108 (FIG. 1, 2). The processing module 800 may be used for one or more of the various functionalities described herein.

The processing module 800 may comprise, for example, a processor 810, memory 820, a communication interface 830, and an IO interface 840. The memory 820 may include non-volatile memory 826 and volatile memory 828. The processing module 800 may use a part of the memory 820 to store information and/or instructions. The operating system 822 and applications 824 may be stored in, for example, the non-volatile memory 826, and may be copied to volatile memory 828 for execution. Various embodiments of the disclosure may use different memory architectures that are design and/or implementation dependent.

The communication interface 830 may allow the processing module 800 to communicate with other devices via, for example, a wired protocol such as USB, Ethernet, Firewire, etc., or a wireless protocol such as Bluetooth, Near Field Communication (NFC), Wi-Fi, etc. The various types of radios for communication may be referred to as a transceiver for the sake of simplicity. The communication interface 830 may also comprise, for example, geographical locating system such as, for example, global positioning system (GPS), Global Navigation Satellite System (GLONASS), etc.

The processing module 800 may also comprise the IO module 840 for communication with a user via the input devices 842 and output information to be displayed on output devices 844. The input devices 842 may comprise, for example, buttons, touch sensitive screen, which may be a part of a display, a microphone, etc. The output devices 844 may comprise, for example, the display, a speaker, LEDs, etc.

The input devices 842 may also comprise, for example, one or more interfaces that are configured to receive electrical signals from the sensor(s) 104/106. The electrical signals may then be provided by the sensor interfaces as digital data for use by the processor 810.

The processor 810 may operate using different architectures in different embodiments. For example, the processor 810 may use the memory 820 to store instructions to execute, or the processor 810 may have its own memory (not shown) for its instructions. Furthermore, various embodiments may have the processor 810 work individually or in concert with other processors that may be in other electronic devices such as, for example, a smartphone, a personal computer, a laptop computer, tablet computer, etc.

Accordingly, as can be seen, the analyzer module 110 may comprise the processor 810 to execute the software/application in the memory 820, where at least one of the software/application may be for calibration of audiometric and entertainment transducers, at least a portion of the communication interface 830 for communicating with other electronic devices including, for example, GPS satellites, and at least a portion of the I/O module 840 for receiving electric signals from the sensors 104/106.

It should be understood that while an example processing module 800 is described, various embodiments may comprise a portion of the processing module 800 or more than what is shown in FIG. 8. For example, a processing module 800 in some cases may be limited with respect to input devices 842 and/or output devices 844. This may be, for example, because the input/output may be via an external device such as a personal computer, a laptop computer, a smartphone, a tablet computer, etc. Various embodiments may have the processing module 800 itself be, for example, a part of a personal computer, a laptop computer, a smartphone, a tablet computer, etc., as well as another type of, for example, general electronic device owned by a user. Accordingly, the calibration system may be very portable when used with, for example, a smartphone, a tablet computer, a laptop computer, etc.

Although the present disclosure has been particularly described with reference to the preferred embodiments thereof, it should be readily apparent to those of ordinary skill in the art that changes and modifications in the form and details may be made without departing from the spirit and scope of the disclosure. Accordingly, the user computing device 108/308/508 and/or the processing module 800 may comprise different configurations.

An example embodiment of the disclosure may be a portable calibration system that calibrates an audio equipment without using a dedicated sound level meter, comprising a coupler configured to couple a transducer to an energy sensor, where an output of the transducer is provided to the energy sensor via the coupler, an analyzer module configured to receive information from the energy sensor regarding the output of the transducer, a processor, in the analyzer module, configured to process the information to provide a result of a calibration for the audio equipment with respect to expected results, and a display configured to show the result of the calibration.

The system may comprise one or more environment sensors configured to detect environmental information and provide the environmental information to the analyzer module, where the processor may be configured to use the environmental information to make corrections to expected results. The energy sensor may be integrated in a common module with the one or more environmental sensors. The energy sensor may be configured to detect one or both mechanical vibrations and sound signals output by the transducer.

One or more adaptors may be configured to directly couple at a first portion to the transducer and directly couple at a second portion to the coupler. One or both of the adaptor and the coupler may be configured such that there are echo and/or resonance mitigation surfaces inside a respective cavity of the adaptor and the coupler. Furthermore, in some embodiments, the energy sensor may not be directly opposite the transducer.

There may be a plurality of adaptors, where each adaptor is configured to couple the coupler with a different one of a plurality of transducers, where one or more of size, shape, and material of each of plurality of the transducers may differ from others of the plurality of transducers.

The processor may be configured to process the information from the energy sensor to determine characteristics of the output of the transducer, where the characteristics comprise one or more of: frequency, duration, distortion, linearity, range of linearity, rise time, fall time, frequency and amplitude spectrum, phase spectrum, amplitude-time waveform, equivalent long-term-exposure level, permissible duration of exposure according to noise exposure standards, distortion level, equivalent sone or phon ratings using relevant physical and psychophysical references and standards, reverberation time of a testing room, and ambient noise level.

The processor may be configured to determine a level of ambient noise from one or both of the information from the energy sensor or environment information from the environment sensor, automatically compare the ambient noise level with different reference calibration standards, and generate a results report indicating whether the ambient noise is suitable for using different types of transducers for testing hearing functions. The display is configured to display the results report. The processor may also be configured to process the information from the energy sensor and automatically compare the processed information with one or more hearing safety standards and inform whether the output of the transducer is safe for a user and how long it is safe for the user.

Another example embodiment of the disclosure may comprise a system for coupling a transducer to a processing device to calibrate an audio equipment without using a dedicated sound level meter. The system may comprise a coupler configured to couple to a first of a plurality of transducers via a first portion of the coupler and to an energy sensor via a second portion of the coupler, where the energy sensor is configured to receive an output of the transducer via the coupler, and an adaptor configured to couple to the first portion of the coupler and to a second of the plurality of transducers, where the energy sensor is configured to receive an output of the transducer via the adaptor and the coupler.

Still another example embodiment of the disclosure may be a method for calibrating an audio equipment using a portable calibration system without a dedicated sound level meter, where the method comprises coupling, with a coupler, a transducer to an energy sensor, where an output of the transducer is provided to the energy sensor via the coupler, receiving, by an analyzer module, information from the energy sensor regarding the output of the transducer, processing, by a processor in the analyzer module, the information to provide a result of a calibration for the audio equipment with respect to expected results, and displaying, on a display, the result of the calibration.

The method may comprise providing, by one or more environment sensors configured to detect environmental information, the environmental information to the analyzer module, where the processor is configured to use the environmental information to make corrections to expected results. The environmental information may comprise, for example, one or more of temperature, humidity, atmospheric pressure, ambient noise level, etc. The method may further comprise directly coupling a first end of an adaptor to the transducer, and directly coupling a second end of the adaptor to the energy sensor.

One or both of the adaptor and the coupler may be configured such that there are echo and/or resonance mitigation surfaces inside a respective cavity of the adaptor and the coupler. The method may further comprise processing, by the processor, the information from the energy sensor determines characteristics of the output of the transducer, where the characteristics comprise one or more of: frequency, duration, distortion, linearity, range of linearity, rise time, fall time, frequency and amplitude spectrum, phase spectrum, amplitude-time waveform, equivalent long-term-exposure level, permissible duration of exposure according to noise exposure standards, distortion level, equivalent sone or phon ratings using relevant physical and psychophysical references and standards, reverberation time of a testing room, and ambient noise level.

The method may comprise automatically generating a correction factor table for a correction factor at different frequencies of the output by the transducer, where the correction factor may be based on one or both of a coupler type and a transducer type.

The method may also comprise processing, by the processor, the information, and automatically comparing the processed information with one or more hearing safety standards, and outputting on a display whether the output of the transducer is safe for a user and how long it is safe for the user.

While various embodiments of the disclosure have been described above, it should be understood that they have been presented as non-limiting examples only. While the foregoing has been described with reference to certain aspects and examples, it will be understood by those skilled in the art that various changes may be made and equivalents may be substituted without departing from the scope of the disclosure. In addition, many modifications may be made to adapt a particular situation or material to the teachings of the disclosure without departing from its scope. Therefore, it is intended that the disclosure not be limited to the particular example(s) disclosed, but that the disclosure will include all examples falling within the scope of the appended claims.

The terminology used here is for the purpose of describing particular embodiments only and is not intended to limit the disclosure. In the drawings, the thickness, width, length, size, etc., of layers, areas, regions, components, elements, etc., may be exaggerated for clarity. Like reference numerals refer to like elements throughout.

As utilized herein, "and/or" means any one or more of the items in the list joined by "and/or." As an example, "x and/or y" means any element of the three-element set {(*x*), (*y*), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y, and/or z" means any combination of x, y, and z. As utilized herein, the term "exemplary" means serving as a non-limiting example, instance, or illustration. As utilized herein, the terms "e.g." and "for example" set off lists of one or more non-limiting examples, instances, or illustrations.

Also, the singular forms are intended to include the plural forms as well, unless the context clearly indicates otherwise. It will be further understood that the terms "comprises," "comprising," "includes," and/or "including," when used in this specification, specify the presence of stated features, numbers, steps, operations, elements, and/or components, but do not preclude the presence or addition of one or more other features, numbers, steps, operations, elements, components, and/or groups thereof.

In addition, it will be understood that when an element A is referred to as being "connected to" or "coupled to" an element B, the element A can be directly connected to or coupled to the element B, or an intervening element C may be present between the elements A and B so that the element A can be indirectly connected to or coupled to the element B.

Furthermore, although the terms first, second, etc., may be used to describe various members, elements, regions, layers and/or sections, these members, elements, regions, layers and/or sections should not be limited by these terms. These terms are only used to distinguish one member, element, region, layer, and/or section from another. Thus, for example, a first member, a first element, a first region, a first layer, and/or a first section discussed below could be termed a second member, a second element, a second region, a second layer, and/or a second section without departing from the teachings of the present disclosure.

Spatially relative terms, such as "upper," "lower," "side," and the like, may be used for ease of description to describe the relationship of one element or feature to another element(s) or feature(s) as illustrated in the figures. It will be understood that the spatially relative terms are intended to encompass different orientations of the device in use or operation in addition to the orientation depicted in the figures. For example, if the device in the figures is turned upside-down, elements described as "below" or "beneath" other elements or features would then be oriented "above" the other elements or features. Thus, the exemplary term "below" can encompass both an orientation of above and below.

What is claimed is:

1. A system, the system comprising:

a transducer of a plurality of transducers, wherein one or more of size, shape, and material of each of plurality of the transducers differ from others of the plurality of transducers;

a plurality of adaptors, wherein each adaptor is configured to couple with the different one of a plurality of transducers;

an energy sensor configured to measure a vibration output by the transducer;

an environmental sensor configured to detect an environmental condition; and a processor configured to generate a calibration for audio equipment according to the measured vibration, wherein the environmental condition is used to adjust the calibration.

2. The system of claim 1, wherein the calibration is generated without using a dedicated sound level meter.

3. The system of claim 1, wherein the energy sensor is integrated in a common module with the environmental sensor.

4. The system of claim 1, wherein the energy sensor is configured to detect one or both mechanical vibrations and sound signals output by the transducer.

5. The system of claim 1, comprising an adaptor configured to directly couple to the transducer.

6. The system of claim 5, wherein the adaptor comprises echo and/or resonance mitigation surfaces.

7. The system of claim 1, wherein the energy sensor is not directly coupled to the transducer.

8. The system of claim 1, wherein:

the processor is configured to process information from the energy sensor to determine one or more of:

frequency, duration, distortion, linearity, range of linearity, rise time, fall time, frequency and amplitude spectrum, phase spectrum, amplitude-time waveform, equivalent long-term-exposure level, permissible duration of exposure according to noise exposure standards, distortion level, equivalent sone or phon ratings using relevant physical and psychophysical references and standards, reverberation time of a testing room, and ambient noise level.

9. The system of claim 1, wherein:

the processor is configured to:

determine an ambient noise level from one or both of the energy sensor and the environmental sensor, automatically compare the ambient noise level with different reference calibration standards, and generate a results report indicating whether the ambient noise level is suitable for using different types of transducers for testing hearing functions, and display the results report.

10. The system of claim 1, wherein the processor is configured to automatically compare processed information with one or more hearing safety standards and inform whether the output of the transducer is safe for a user and how long it is safe for the user.

11. The system of claim 1, wherein the system comprises a coupler configured to couple the transducer to the energy sensor.

12. The system of claim 1, wherein the processor is operable to generate a correction factor table for a correction factor at different frequencies of the output by the transducer.

13. A method for calibrating, comprising:

coupling a transducer to an energy sensor;

receiving, from the energy sensor, a vibration measurement according to an output of the transducer;

generating a calibration for audio equipment according to the vibration measurement;

correcting the calibration for the audio equipment according to an environmental condition;

comparing the processed information with one or more hearing safety standards; and outputting on a display whether the output of the transducer is safe for a user and how long it is safe for the user.

14. The method of claim 13, comprising:

directly coupling a first end of an adaptor to the transducer; and directly coupling a second end of the adaptor to a coupler.

15. The method of claim 14, wherein one or both of the adaptor and the coupler are configured such that there are echo and/or resonance mitigation surfaces inside a respective cavity of the adaptor and the coupler.

16. The method of claim 13, wherein processing comprises determining one or more of:

frequency,
duration,
distortion,
linearity,
range of linearity,
rise time,
fall time,
frequency and amplitude spectrum,
phase spectrum,
amplitude-time waveform,
equivalent long-term-exposure level,
permissible duration of exposure according to noise exposure standards, distortion level,
equivalent sone or phon ratings using relevant physical and psychophysical references and standards,
reverberation time of a testing room, and
ambient noise level.

17. The method of claim 13, wherein the method comprises:

automatically generating a correction factor table for a correction factor at different frequencies of the output by the transducer, wherein the correction factor is based on one or both of: a coupler type and a transducer type.

18. The method of claim 13, wherein the environmental condition comprises one or more of temperature, humidity, atmospheric pressure and ambient noise.

19. A system, the system comprising:

a transducer;

an energy sensor configured to measure a vibration output by the transducer;

an environmental sensor configured to detect an environmental condition; and a processor configured to:

generate a calibration for audio equipment according to the measured vibration, wherein the environmental condition is used to adjust the calibration, determine an ambient noise level from one or both of the energy sensor and the environmental sensor, automatically compare the ambient noise level with different reference calibration standards, and generate a results report indicating whether the ambient noise level is suitable for using different types of transducers for testing hearing functions, and display the results report.

20. The system of claim 19, wherein the calibration is generated without using a dedicated sound level meter.

21. The system of claim 19, wherein the energy sensor is integrated in a common module with the environmental sensor.

22. The system of claim 19, wherein the energy sensor is configured to detect one or both mechanical vibrations and sound signals output by the transducer.

23. The system of claim 19, comprising an adaptor configured to directly couple to the transducer.

24. The system of claim 23, wherein the adaptor comprises echo and/or resonance mitigation surfaces.

25. The system of claim 19, wherein the energy sensor is not directly coupled to the transducer.

26. The system of claim 19, wherein:

the processor is configured to process information from the energy sensor to
determine one or more of:
frequency,
duration,
distortion,
linearity,
range of linearity,
rise time,
fall time,
frequency and amplitude spectrum,
phase spectrum,
amplitude-time waveform,
equivalent long-term-exposure level,
permissible duration of exposure according to noise exposure standards, distortion level,
equivalent sone or phon ratings using relevant physical and psychophysical references and standards,
reverberation time of a testing room, and
ambient noise level.

27. The system of claim 19, wherein the processor is configured to automatically compare processed information with one or more hearing safety standards and inform whether the output of the transducer is safe for a user and how long it is safe for the user.

28. The system of claim 19, wherein the system comprises a coupler configured to couple the transducer to the energy sensor.

29. The system of claim 19, wherein the processor is operable to generate a correction factor table for a correction factor at different frequencies of the output by the transducer.

30. A system, the system comprising:

a transducer;

an energy sensor configured to measure a vibration output by the transducer;

an environmental sensor configured to detect an environmental condition; and a processor configured to:

generate a calibration for audio equipment according to the measured vibration, wherein the environmental condition is used to adjust the calibration, and automatically compare processed information with one or more hearing safety standards and inform whether the output of the transducer is safe for a user and how long it is safe for the user.

31. The system of claim 30, wherein the calibration is generated without using a dedicated sound level meter.

32. The system of claim 30, wherein the energy sensor is integrated in a common module with the environmental sensor.

33. The system of claim 30, wherein the energy sensor is configured to detect one or both mechanical vibrations and sound signals output by the transducer.

34. The system of claim 30, comprising an adaptor configured to directly couple to the transducer.

35. The system of claim 34, wherein the adaptor comprises echo and/or resonance mitigation surfaces.

36. The system of claim 30, wherein the energy sensor is not directly coupled to the transducer.

37. The system of claim 30, wherein:

the processor is configured to process information from the energy sensor to determine one or more of:

frequency, duration, distortion, linearity, range of linearity, rise time, fall time, frequency and amplitude spectrum, phase spectrum, amplitude-time waveform, equivalent long-term-exposure level, permissible duration of exposure according to noise exposure standards, distortion level, equivalent sone or phon ratings using relevant physical and psychophysical references and standards, reverberation time of a testing room, and ambient noise level.

38. The system of claim 30, wherein the system comprises a coupler configured to couple the transducer to the energy sensor.

39. The system of claim 30, wherein the processor is operable to generate a correction factor table for a correction factor at different frequencies of the output by the transducer.

40. A system, the system comprising:

a transducer;

an adaptor configured to directly couple to the transducer, wherein the adaptor comprises echo and/or resonance mitigation surfaces;

an energy sensor configured to measure a vibration output by the transducer;

an environmental sensor configured to detect an environmental condition; and a processor configured to generate a calibration for audio equipment according to the measured vibration, wherein the environmental condition is used to adjust the calibration.

41. The system of claim 40, wherein the calibration is generated without using a dedicated sound level meter.

42. The system of claim 40, wherein the energy sensor is integrated in a common module with the environmental sensor.

43. The system of claim 40, wherein the energy sensor is configured to detect one or both mechanical vibrations and sound signals output by the transducer.

44. The system of claim 40, wherein the energy sensor is not directly coupled to the transducer.

45. The system of claim 40, wherein:

the processor is configured to process information from the energy sensor to determine one or more of:

frequency, duration, distortion, linearity, range of linearity, rise time, fall time, frequency and amplitude spectrum, phase spectrum, amplitude-time waveform, equivalent long-term-exposure level, permissible duration of exposure according to noise exposure standards, distortion level, equivalent sone or phon ratings using relevant physical and psychophysical references and standards, reverberation time of a testing room, and ambient noise level.

46. The system of claim 40, wherein the system comprises a coupler configured to couple the transducer to the energy sensor.

47. The system of claim 40, wherein the processor is operable to generate a correction factor table for a correction factor at different frequencies of the output by the transducer.

* * * * *